UNITED STATES PATENT OFFICE.

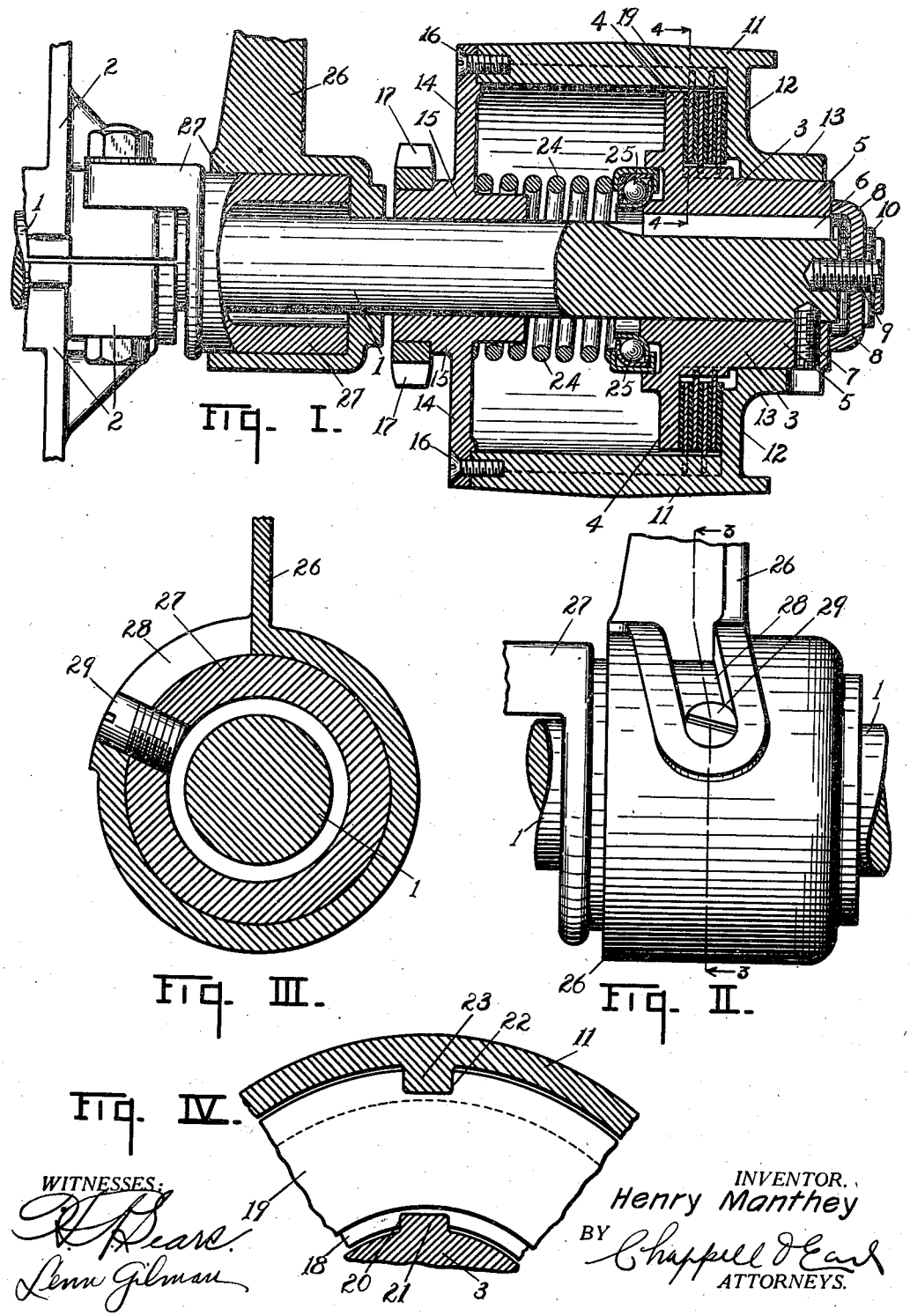

HENRY MANTHEY, OF LANSING, MICHIGAN, ASSIGNOR TO THE "NEW WAY" MOTOR COMPANY, OF LANSING, MICHIGAN.

CLUTCH.

1,192,793.   Specification of Letters Patent.   Patented July 25, 1916.

Application filed February 8, 1916. Serial No. 76,917.

*To all whom it may concern:*

Be it known that I, HENRY MANTHEY, a citizen of the United States, residing at Lansing, Michigan, have invented certain new and useful Improvements in Clutches, of which the following is a specification.

This invention relates to improvements in clutches.

My improved clutch is especially designed by me for use in engines adapted to be mounted on harvesters, such as is shown in the application of Robert H. Branfield, filed November 6, 1915, Ser. No. 60,079, as such an engine, on account of the position in which it is mounted on the harvester, requires compactness.

The main object of this invention is to provide an improved clutch which is compact in structure and at the same time one which is effective and durable in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view of my improved clutch, partially in central longitudinal section. Fig. II is an enlarged detail side elevation of the shifting lever. Fig. III is a detail transverse section on a line corresponding to the broken line 3—3 of Fig. II. Fig. IV is an enlarged detail section on a line corresponding to line 4—4 of Fig. I in the drawing.

In the drawing, similar reference characters refer to similar parts throughout the several views, and the sectional views are taken looking in the direction of the little arrows at the ends of the section lines.

Referring to the drawing, 1 represents the driving shaft, such as the crank shaft of an engine. The bearing 2 of the driving shaft is arranged so that the shaft projects beyond the bearing. My improved clutch mechanism is applied on the projecting end of the shaft. On the outer end of the shaft I key the driving clutch member 3 having a flange 4 at its inner end and a projecting hub-like bearing portion 5 at its outer end. The clutch member 3 is secured to the shaft by the feather or key 6 and I also preferably provide a set screw 7. A cap 8 engages the outer end of the shaft member 3 and is secured by means of the screw 9 having a cotter's pin 10 therethrough.

The driven shaft member 11 is drum-like in form and provided with an outer head 12 having a hub-like bearing 13 mounted on the bearing portion 5 of the driving clutch member for rotative and axial movement. The driven clutch member 11 has an inner head 14 provided with a hub-like bearing 15 mounted on the shaft 1 for rotative and axial movement. The head 14 is removably secured by means of the screws 16. On the outer end of the hub 15 is a sprocket wheel 17.

A series of driving and driven friction disks 18 and 19, respectively, are interposed between the flange 4 of the driving clutch member and the outer head 12 of the driven clutch member. The disks 18 are notched at 20 to engage the longitudinal driving ribs or lugs 21 on the driving clutch member. The driven disks 19 are notched at 22 to engage the longitudinal driving lugs 23 on the driven member 11. Thus arranged, the driving and driven disks may be clamped between the driving and driven members to provide a friction driving connection between them. The clutch is actuated by the coiled spring 24, the inner end of which is mounted on the inner bearing hub 15 of the driven clutch member. The outer end of the spring engages a ball thrust bearing 25 carried by the driving clutch member. Thus arranged, the spring normally holds the clutch in engaging position. To release the clutch the driven clutch member is shifted axially against the tension of the spring, thus releasing the friction disks.

The shifting lever 26 is mounted at the inner side of the driven clutch member. It is rotatably mounted upon the support 27 which, in turn, is mounted on the bearing 2. The hub of the lever 26 has a cam slot 28 therein with which the pin 29 projecting from the support engages so that as the lever is rocked on its pivot its hub is shifted longitudinally into and out of engagement with the driven clutch member. When shifted to one position the hub of the lever is carried inwardly engaging the end of the inner bearing of the driven clutch member forcing it outwardly against the tension of the spring and thereby releasing the clutch. When the lever 26 is shifted in the other direction its hub is retracted and releases the driven clutch member allowing the spring 24 to act and engage the clutch.

My improved clutch is very compact and is well adapted for use on engines mounted on harvesters, as shown in the application above referred to, where it is necessary to arrange the parts so that they will not interfere with the frame and other parts of the harvester.

I have not attempted to illustrate or describe certain modifications in structural details, which I contemplate or which might be considered desirable, as I believe the disclosures made will enable those skilled in the art to which my invention relates to embody or adapt the same as conditions or the particular adaptation may require.

Having thus described my invention, what I claim as new and desire to secure by Letters Patent, is:

1. In a clutch, the combination of a shaft bearing, a driving shaft extended beyond the bearing, a driving clutch member disposed at the outer end of said shaft and keyed thereto, said driving clutch member having a flange portion at its inner end and a hub-like portion at its outer end constituting a bearing, a drum-like driven clutch member embracing said driving clutch member and provided with inner and outer heads having bearing hubs mounted on said shaft and driving clutch member, respectively, for rotative and axial movement, coacting driving and driven friction disks interposed between said driving member flange and driven member outer head and connected to said members, a coiled spring disposed with its inner end on the inner bearing hub of said driven member for actuating said clutch members to engaging position, a thrust bearing interposed between the outer end of said spring and said driving clutch member, a lever support mounted at the inner end of said driven clutch member, a lever mounted for rotative adjustment on said support and having a cam slot therein, said support being provided with a pin engaging said slot, so that when said lever is rocked to one position it shifts said driven clutch member longitudinally releasing the clutch, and a sprocket mounted on the inner bearing hub of said driven member.

2. In a clutch, the combination of a shaft bearing, a driving shaft extended beyond the bearing, a driving clutch member disposed at the outer end of said shaft and keyed thereto, said driving clutch member having a flange portion at its inner end and a hub-like portion at its outer end constituting a bearing, a drum-like driven clutch member embracing said driving clutch member and provided with inner and outer heads having bearing hubs mounted on said shaft and driving clutch member, respectively, for rotative and axial movement, coacting driving and driven friction disks interposed between said driving member flange and driven member outer head and connected to said members, a coiled spring disposed with its inner end on the inner bearing hub of said driven member for actuating said clutch members to engaging position, a thrust bearing interposed between the outer end of said spring and said driving clutch member, and a shifting lever mounted between said shaft bearing and said driven clutch member.

3. In a clutch, the combination of a shaft bearing, a driving shaft extended beyond the bearing, a driving clutch member disposed at the outer end of said shaft and keyed thereto, said driving clutch member having a flange portion at its inner end and a hub-like portion at its outer end constituting a bearing, a drum-like driven clutch member embracing said driving clutch member and provided with inner and outer heads having bearing hubs mounted on said shaft and driving clutch member, respectively, for rotative and axial movement, coacting driving and driven friction disks interposed between said driving member flange and driven member outer head and connected to said members, a coiled spring disposed between the inner end of said driven clutch member and the inner head of said driving clutch member for actuating said clutch members to engaging position, a lever support mounted at the inner end of said driven clutch member, and a clutch disengaging lever mounted on said support.

4. In a clutch, the combination of a shaft bearing, a driving shaft extended beyond the bearing, a driving clutch member disposed at the outer end of said shaft and keyed thereto, said driving clutch member having a flange portion at its inner end and a hub-like portion at its outer end constituting a bearing, a drum-like driven clutch member embracing said driving clutch member and provided with inner and outer heads having bearing hubs mounted on said shaft and driving clutch member, respectively, for rotative and axial movement, coacting driving and driven friction disks interposed between said driving member flange and driven member outer head and connected to said members, a coiled spring disposed between the inner end of said driven clutch member and the inner head of said driving clutch member for actuating said clutch members to engaging position, and means for shifting said driven clutch member for releasing said clutch.

5. In a clutch, the combination of a shaft bearing, a driving shaft extended beyond the bearing, a driving clutch member disposed at the outer end of said shaft and keyed thereto, a drum-like driven clutch member embracing said driving clutch member and provided with inner and outer bearing hubs mounted for rotative and axial movement, coacting driving and driven friction disks connected to said driving member and driven member, respectively, a coiled spring disposed between the inner end of said driven clutch member and said driving clutch member for actuating said clutch members to engaging position, a lever support mounted at the inner end of said driven clutch member, and a clutch disengaging lever mounted on said support.

In witness whereof, I have hereunto set my hand and seal in the presence of two witnesses.

HENRY MANTHEY. [L. S.]

Witnesses:
 E. W. Goonow,
 S. B. Spalding.